(12) United States Patent
Nagashima et al.

(10) Patent No.: US 12,572,037 B2
(45) Date of Patent: Mar. 10, 2026

(54) OPTICAL MODULE

(71) Applicants: FURUKAWA ELECTRIC CO., LTD.,
Tokyo (JP); NTT, Inc., Tokyo (JP)

(72) Inventors: Kazuya Nagashima, Tokyo (JP); Yozo Ishikawa, Tokyo (JP); Josuke Ozaki, Musashino (JP); Yasuaki Hashizume, Musashino (JP)

(73) Assignees: FURUKAWA ELECTRIC CO., LTD.,
Tokyo (JP); NTT, Inc., Tokyo (JP)

( * ) Notice: Subject to any disclaimer, the term of this patent is extended or adjusted under 35 U.S.C. 154(b) by 264 days.

(21) Appl. No.: 18/318,894

(22) Filed: May 17, 2023

(65) Prior Publication Data

US 2023/0288737 A1     Sep. 14, 2023

Related U.S. Application Data

(63) Continuation of application No. PCT/JP2021/043610, filed on Nov. 29, 2021.

(30) Foreign Application Priority Data

Dec. 1, 2020     (JP) ................................. 2020-199927

(51) Int. Cl.
   *G02F 1/01*          (2006.01)
(52) U.S. Cl.
   CPC .......... *G02F 1/0136* (2013.01); *G02F 1/0115* (2013.01)
(58) Field of Classification Search
   CPC ....... G02F 1/0136; G02F 1/0115; G02B 5/30; G02B 6/27; G02B 6/42
   See application file for complete search history.

(56) References Cited

U.S. PATENT DOCUMENTS

2002/0102053 A1*  8/2002  Savchenko .............. G02B 6/42
                                                              385/11
2017/0019181 A1*  1/2017  Flintham .............. G02B 6/4213
                        (Continued)

FOREIGN PATENT DOCUMENTS

CN       106464383 A     2/2017
CN       110875782 A     3/2020
                  (Continued)

OTHER PUBLICATIONS

International Search Report issued Feb. 8, 2022 in PCT/JP2021/043610 filed on Nov. 29, 2021, 2 pages.
                  (Continued)

*Primary Examiner* — Mariam Qureshi
(74) *Attorney, Agent, or Firm* — Oblon, McClelland, Maier & Neustadt, L.L.P.

(57)          ABSTRACT

An optical module includes: a polarization controller that includes a main body including a polarization multiplexer and demultiplexer portion that, upon input of two kinds of light that are in perpendicularly-polarized states, performs polarization multiplexing on the two kinds of light and output polarization-multiplexed light, and upon input of light, performs polarization demultiplexing on the light and outputs two kinds of light that are in perpendicularly-polarized states, a first polarizer, a first input portion, a second input portion, a third input portion, a first output portion, and a second output portion; and an optical device configured to receive input of light via the polarization controller and output light via the polarization controller.

14 Claims, 7 Drawing Sheets

(56) References Cited

U.S. PATENT DOCUMENTS

| | | | |
|---|---|---|---|
| 2018/0316422 A1* | 11/2018 | Kato | G01M 11/3181 |
| 2019/0171029 A1 | 6/2019 | Urata et al. | |
| 2020/0073063 A1* | 3/2020 | Kurokawa | G02B 6/4213 |
| 2021/0320719 A1 | 10/2021 | Nagashima et al. | |

FOREIGN PATENT DOCUMENTS

| | | |
|---|---|---|
| JP | 4-282608 A | 10/1992 |
| JP | 2008-268245 A | 11/2008 |
| JP | 2017-513071 A | 5/2017 |
| JP | 2020-34801 A | 3/2020 |
| WO | WO 2020/138337 A1 | 7/2020 |

OTHER PUBLICATIONS

Office Action issued Dec. 12, 2025 in Chinese Patent Application No. 202180080803.0 with English translation of the cover page and English machine translation of the main body thereof, citing Doc. Nos. 1 & 2, 14 pages.

* cited by examiner

OPTICAL MODULE

REFERENCE TO RELATED APPLICATION(S)

This application is a continuation of International Application No. PCT/JP2021/043610, filed on Nov. 29, 2021 which claims the benefit of priority of the prior Japanese Patent Application No. 2020-199927, filed on Dec. 1, 2020, the entire contents of which are incorporated herein by reference.

BACKGROUND OF THE INVENTION

The present disclosure relates to an optical module.

A polarization controller that includes a polarization multiplexer and demultiplexer portion is known. The polarization multiplexer and demultiplexer portion, if two kinds of light that are in perpendicularly-polarized states are input, performs polarization multiplexing on the two kinds of light and outputs the polarization-multiplexed light. Further, due to reciprocity of light, the polarization multiplexer and demultiplexer portion, if light is input, performs polarization demultiplexing on the light and outputs two kinds of light that are in perpendicularly-polarized states. The polarization controller as described above is used for, for example, a modulator module for optical communication. The modulator module is one kind of optical module and includes a modulator. The modulator, if light is input, modulates the light and outputs two kinds of light that are in perpendicularly-polarized states, for example. The polarization controller performs polarization multiplexing on two kinds of light input from the modulator and outputs the polarization-multiplexed light from the modulator module (Japanese Translation of PCT International Application Publication No. 2017-513071).

SUMMARY OF THE INVENTION

The modulator has a problem in that if a polarized state of input light is not a desired polarized state, it is difficult to provide designed desired performance at a maximum. For example, if the input light is in a linearly-polarized state in which a degree of polarization is low, a degree of modulation of two kinds of light to be output in the modulator may decrease. This problem is not limited to the modulator, and the same problem may occur in an optical device whose performance is dependent on the polarized state of light.

However, to achieve a desired polarized state as the polarized state of light, a longer time may be needed for operation of adjusting the polarized state, and, even if the adjustment is performed, it may be difficult to achieve desired accuracy, so that a degree of difficulty in assembling the optical module may increase.

In that regard, it is desirable to provide an optical module that is able to prevent an increase in a degree of difficulty in assembling and to prevent a decrease in performance in accordance with a polarized state of light.

In some embodiments, an optical module includes: a polarization controller that includes a main body including a polarization multiplexer and demultiplexer portion that, upon input of two kinds of light that are in perpendicularly-polarized states, performs polarization multiplexing on the two kinds of light and output polarization-multiplexed light, and upon input of light, performs polarization demultiplexing on the light and outputs two kinds of light that are in perpendicularly-polarized states, a first polarizer, a first input portion, a second input portion, a third input portion, a first output portion, and a second output portion; and an optical device configured to receive input of light via the polarization controller and output light via the polarization controller. The optical device is configured to output first light and second light to the polarization controller, the polarization controller is configured to perform, by the polarization multiplexer and demultiplexer portion, polarization multiplexing on the first light that is input from the first input portion and the second light that is input from the second input portion, and output polarization-multiplexed light as third light from the first output portion, and the polarization controller is configured to allow fourth light that is input from the third input portion to pass through the first polarizer and output the fourth light from the second output portion to the optical device.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Embodiments will be described below with reference to the drawings. The disclosure is not limited by the embodiment below. Further, in description of the drawings, the same or corresponding elements are appropriately denoted by the same reference symbols. Furthermore, it is necessary to note that the drawings are schematic, and dimensional relations among the components, ratios among the components, and the like may be different from the actual ones. Moreover, the drawings may include portions that have different dimensional relations or ratios.

First Embodiment

Figure 1:
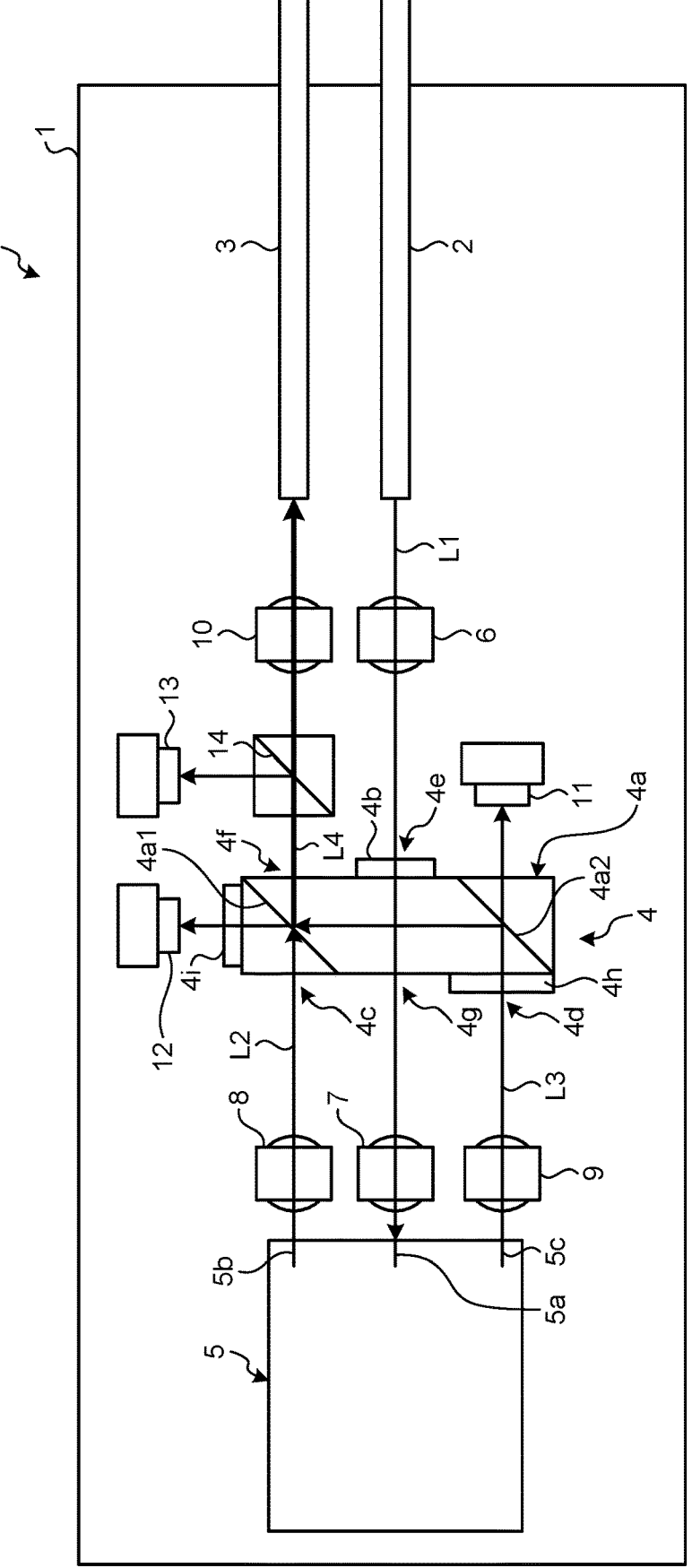
FIG. 1 is a schematic diagram illustrating a configuration of an optical module according to a first embodiment.

FIG. 1 is a schematic diagram illustrating a configuration of an optical module according to a first embodiment.

An optical module 100 includes a casing 1, components that are housed in the casing 1, and a first optical fiber 2 and a second optical fiber 3 that are inserted in the casing 1.

The components housed in the casing 1 are a polarization controller 4, a modulator 5 that is an optical device, lenses 6, 7, 8, 9, and 10, light receiving elements 11, 12, and 13, such as photodiodes, and a beam splitter 14.

The polarization controller 4 includes a main body 4a, a first polarizer 4b, a first input portion 4c, a second input portion 4d, a third input portion 4e, a first output portion 4f, a second output portion 4g, a half wave plate 4h, and a polarizer 4i.

The main body 4a includes a polarization multiplexer and demultiplexer portion 4a1 and a reflecting portion 4a2. The main body 4a is formed in an approximately rectangular shape and made of at least one of glass, calcite, $YVO_4$, $Li_2B_4O_7$, and $TiO_2$.

The first input portion 4c, the second output portion 4g, and the second input portion 4d are arranged in this order on a same surface side of the main body 4a at the side of the modulator 5. The third input portion 4e and the first output portion 4f are arranged on a same surface side of the main body 4a at the side of the first optical fiber 2 and the second optical fiber 3.

The modulator 5 includes a light input portion 5a and light output portions 5b and 5c.

The first optical fiber 2 is, for example, a polarization-maintaining optical fiber, and outputs light L1 as fourth light to the polarization controller 4. The light L1 has an approximately linearly-polarized state as an approximately p-polarized wave. In the present embodiment, a polarization direction of the p-polarized wave is parallel to the sheet of the drawing. The lens 6 collimates the light L1 and allows the light L1 to enter the third input portion 4e of the polarization controller 4.

The polarization controller 4 allows the light L1 that is input from the third input portion 4e to pass through the first polarizer 4b and outputs the light L1 from the second output portion 4g to the modulator 5. The first polarizer 4b is arranged so as to transmit a p-polarized wave and is bonded to the main body 4a by an adhesive agent or optical contact, for example. It is preferable that the adhesive agent is transparent with respect to the light L1 that is input to the polarization controller 4. The optical contact is a technology for improving smoothness of a bonding target surface by high-precision polishing and achieving bonding without using an adhesive agent or the like.

The first polarizer 4b is made of at least one of glass, calcite, $YVO_4$, $Li_2B_4O_7$, and $TiO_2$. Further, the first polarizer 4b may be configured by forming a fine grid made of metal on a surface of glass, for example.

The light L1 passes through the first polarizer 4b, so that a degree of polarization of the light L1 that is output to the modulator 5 increases. The lens 7 condenses the light L1 and allows the light L1 to enter the light input portion 5a of the modulator 5.

The modulator 5 modulates the light L1 that is input via the polarization controller 4, outputs light L2 that is first light as modulated light from the light output portion 5b, and outputs light L3 that is second light from the light output portion 5c. The light L2 and the light L3 are subjected to, for example, I modulation and Q modulation. The light L2 and the light L3 have approximately linearly-polarized states as approximately p-polarized light.

The lens 8 collimates the light L2 and allows the light L2 to enter the first input portion 4c of the polarization controller 4. The lens 9 collimates the light L3 and allows the light L3 to enter the second input portion 4d of the polarization controller 4.

The polarization controller 4 includes a half wave plate 4h in the second input portion 4d. For example, the half wave plate 4h is bonded to the main body 4a by an adhesive agent or optical contact. The half wave plate 4h rotates the polarization direction of the light L3 to obtain approximately s-polarized light. Here, the s-polarized wave and the p-polarized wave are in linearly-polarized states in which respective polarized states are perpendicular to each other. The half wave plate 4h is located on the opposite side of the first polarizer 4b with respect to the main body 4a. With this configuration, physical interference does not occur between the half wave plate 4h and the first polarizer 4b.

The reflecting portion 4a2 reflects the light L3 toward the polarization multiplexer and demultiplexer portion 4a1. Meanwhile, a prat of the light L3 passes through the reflecting portion 4a2 and enters the light receiving elements 11. The light receiving elements 11 outputs an electrical signal corresponding to received light intensity. The electrical signal is used to monitor intensity of the light L3.

The polarization multiplexer and demultiplexer portion 4a1 performs polarization multiplexing on the light L2 and the light L3, and outputs polarization-multiplexed light as light L4 that is third light from the first output portion 4f. Meanwhile, a part of the light L2 is reflected by the polarization multiplexer and demultiplexer portion 4a1, passes through the polarizer 4i, and enters the light receiving elements 12. The light receiving elements 12 outputs an electrical signal corresponding to received light intensity. The electrical signal is used to monitor intensity of the light L2. The polarizer 4i is arranged so as to transmit a p-polarized wave and is bonded to the main body 4a by an adhesive agent or optical contact. The polarizer 4i prevents leaked light coming from the polarization multiplexer and demultiplexer portion 4a1 from entering the light receiving elements 12. With this configuration, it is possible to prevent reduction in monitoring accuracy of the light L2 in the light receiving elements 12.

The beam splitter 14 reflects a part of the light L4 toward the light receiving element 13 and allows the part of the light L4 to enter the light receiving element 13. The light receiving element 13 outputs an electrical signal corresponding to received light intensity. The electrical signal is used to monitor intensity of the light L4. The lens 10 condenses the light L4 and allows the light 14 to enter the second optical fiber 3. In other words, the polarization controller 4 outputs the light L4 to the second optical fiber. The second optical fiber 3 is, for example, a polarization independent optical fiber and is able to transfer, in a preferable manner, the light L4 that is subjected to polarization multiplexing.

In the polarization controller 4, an optical path of the light L1 is located between an optical path of the light L2 and an optical path of the light L3.

In the optical module 100 configured as described above, the modulator 5 receives input of the light L1 via the polarization controller 4, and outputs the light L2 and the light L3 as the light L4 via the polarization controller 4. In this case, even if a degree of polarization of the light L1 that is output by the first optical fiber 2 is somewhat low, the polarization controller 4 increases, by the first polarizer 4b, the degree of polarization of the light L1 that is to be output to the modulator 5. As a result, it is possible to set degrees of modulation of the two kinds of light, such as the light L2 and the light L3, to be output to the modulator 5 to desired values.

For example, if the position of the first optical fiber 2 is adjusted by adjusting an angle around an optical axis of a polarization-maintaining optical fiber to accurately adjust the polarized state of the light L1 to the p-polarized light, operation of the adjustment generally needs a certain time or adjustment accuracy may be reduced. In this case, a degree of difficulty in assembling the optical module 100 increases. Furthermore, if the first optical fiber 2 is a polarization independent optical fiber, it is extremely difficult to accurately adjust the polarized state of the light L1 to the p-polarized light and the polarized state is instable.

In contrast, in the optical module 100, the first polarizer 4b increases the degree of polarization of the light L1, so that it is possible to prevent an increase in the degree of difficulty in assembling the optical module 100 and prevent a decrease in performance of the modulator 5. Meanwhile, as for angular precision at the time of positioning the polarization multiplexer and demultiplexer portion 4a1, the first polarizer 4b, and the half wave plate 4h in the polarization controller 4, with use of well-known techniques, it is possible to easily achieve certain precision that is more than twice higher than angular precision around the optical axis that is obtained when the first optical fiber 2 is a polarization maintaining optical fiber.

MODIFICATIONS

Modifications of the polarization controller that is available in place of the polarization controller 4 in the optical module 100 or an optical module similar to the optical module 100 will be described below.

First Modification

Figure 2:
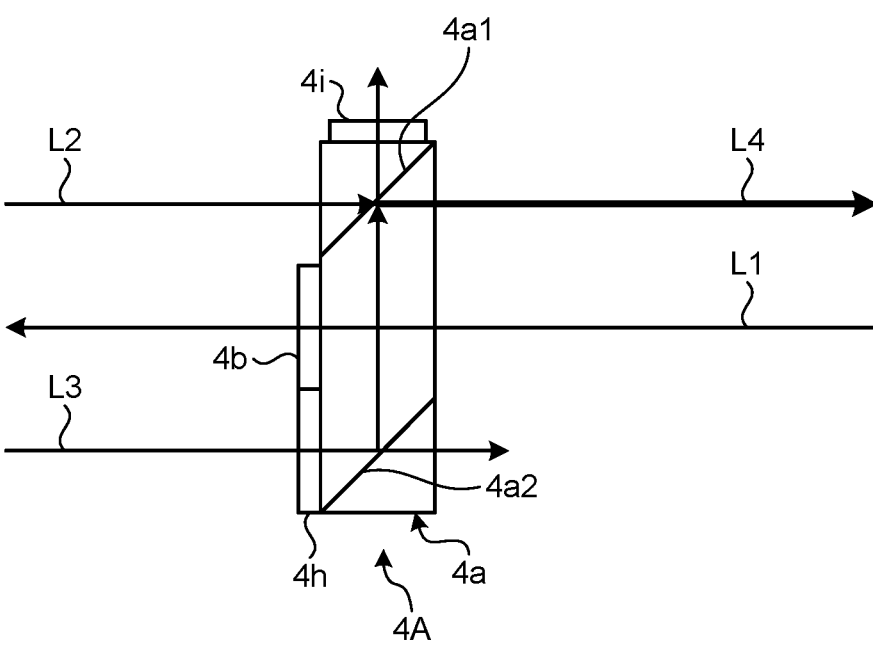
FIG. 2 is a schematic diagram illustrating a polarization controller according to a first modification.

FIG. 2 is a schematic diagram illustrating a polarization controller of a first modification. A polarization controller 4A is different from the polarization controller 4 in that the first polarizer 4b is bonded to the main body 4a on the same side as the half wave plate 4h, and the difference will be mainly described below. In the polarization controller 4A, the light L1 first passes through the main body 4a, and subsequently passes through the first polarizer 4b.

In an optical module using the polarization controller 4A according to the first modification, similarly to the polarization controller 4, the first polarizer 4b increases the degree of polarization of the light L1, so that it is possible to prevent an increase in the degree of difficulty in assembling the optical module and prevent a decrease in performance of the modulator 5.

Furthermore, in the polarization controller 4A, the first polarizer 4b is bonded to the main body 4a at the same side as the half wave plate 4h, so that a step between the first polarizer 4b and the half wave plate 4h is reduced and it becomes easy to collectively apply anti-reflecting coating on surfaces of the first polarizer 4b and the half wave plate 4h, which is advantageous. Moreover, if a dummy glass plate, which has the same thickness as the first polarizer 4b and which has a function to simply transmit the light L2, is bonded, in a side-by-side manner with the first polarizer 4b, to a surface through which the light L2 enters the main body 4a, a step at a side of the main body 4a on which the first polarizer is boded is further reduced, so that it becomes more easy to apply anti-reflecting coating.

Second Modification

Figure 3:
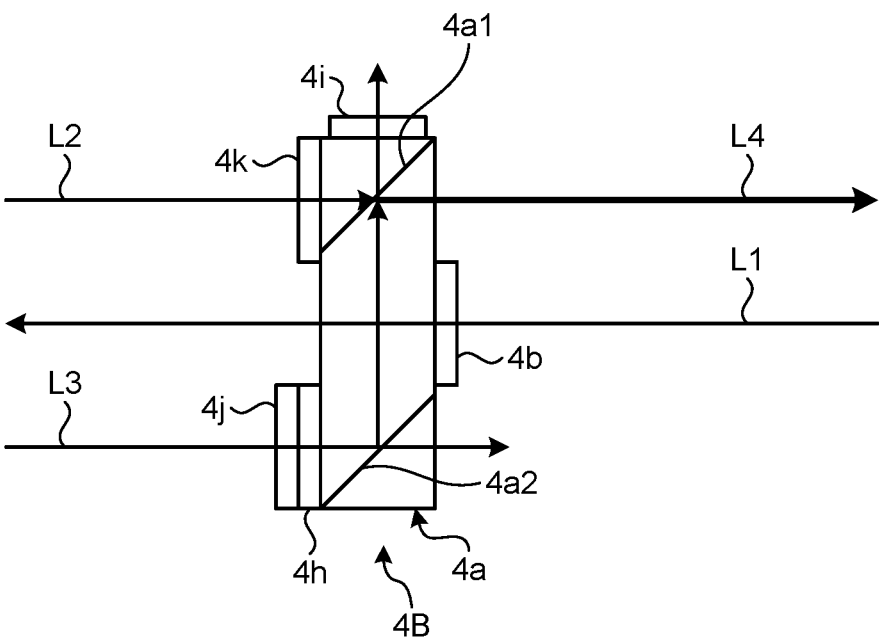
FIG. 3 is a schematic diagram illustrating a polarization controller according to a second modification.

FIG. 3 is a schematic diagram illustrating a polarization controller of a second modification. A polarization controller 4B is configured to further include a second polarizer 4k and a third polarizer 4j in the configuration of the polarization controller 4.

The second polarizer 4k is arranged so as to transmit a p-polarized wave and is bonded to the main body 4a by an adhesive agent or optical contact, for example. The second polarizer 4k allows the light L2 to pass through the main body 4a.

The third polarizer 4j is arranged so as to transmit a p-polarized wave and is bonded to the half wave plate 4h by an adhesive agent or optical contact, for example. The third polarizer 4j allows the light L3 to pass through the main body 4a via the half wave plate 4h.

In an optical module using the polarization controller 4B according to the second modification, similarly to the polarization controller 4, the first polarizer 4b increases the degree of polarization of the light L1, so that it is possible to prevent an increase in the degree of difficulty in assembling the optical module and prevent a decrease in performance of the modulator 5.

Furthermore, in the polarization controller 4A, the second polarizer 4k allows the light L2 to pass through the main body 4a and the third polarizer 4j allows the light L3 to pass through the main body 4a, so that the degrees of polarization of the light L2 and the light L3 increase. As a result, quality of polarization multiplexing in the main body 4a increases and quality of the light L4 that is subjected to the polarization multiplexing also increases.

Third Modification

Figure 4:
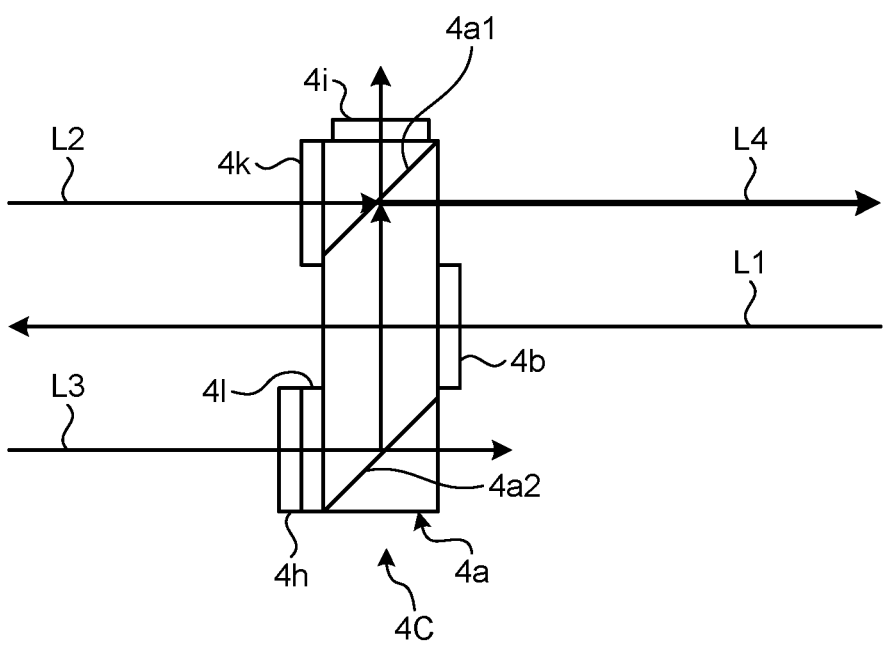
FIG. 4 is a schematic diagram illustrating a polarization controller according to a third modification.

FIG. 4 is a schematic diagram illustrating a polarization controller of a third modification. A polarization controller 4C is configured such that the third polarizer 4j of the polarization controller 4B is removed, a third polarizer 4l is added, and the third polarizer 4l and the half wave plate 4h are arranged in this order from the main body 4a side.

The third polarizer 4l is arranged so as to transmit an s-polarized wave and is bonded to the main body 4a by an adhesive agent or optical contact, for example. In this case, the half wave plate 4h first converts the light L3 from the p-polarized light to the s-polarized light, and the third polarizer 4l allows the light L3 that is the s-polarized light to pass through the main body 4a.

In an optical module using the polarization controller 4C according to the third modification, similarly to the polarization controller 4, the first polarizer 4b increases the degree of polarization of the light L1, so that it is possible to prevent an increase in the degree of difficulty in assembling the optical module and prevent a decrease in performance of the modulator 5.

Furthermore, in the polarization controller 4C, the second polarizer 4k allows the light L2 to pass through the main body 4a, and the third polarizer 4l allows the light L3 to pass through the main body 4a, so that the degrees of polarization of the light L2 and the light L3 increase. As a result, quality of polarization multiplexing in the main body 4a increases and quality of the light L4 that is subjected to the polarization multiplexing also increases.

Moreover, in the polarization controller 4C, if the second polarizer 4k and the third polarizer 4l are first bonded to the main body 4a, and thereafter, the half wave plate 4h is bonded to the third polarizer 4l, it is possible to separately perform a bonding process of each of the polarizers and a bonding process of the half wave plate.

Fourth Modification

Figure 5:
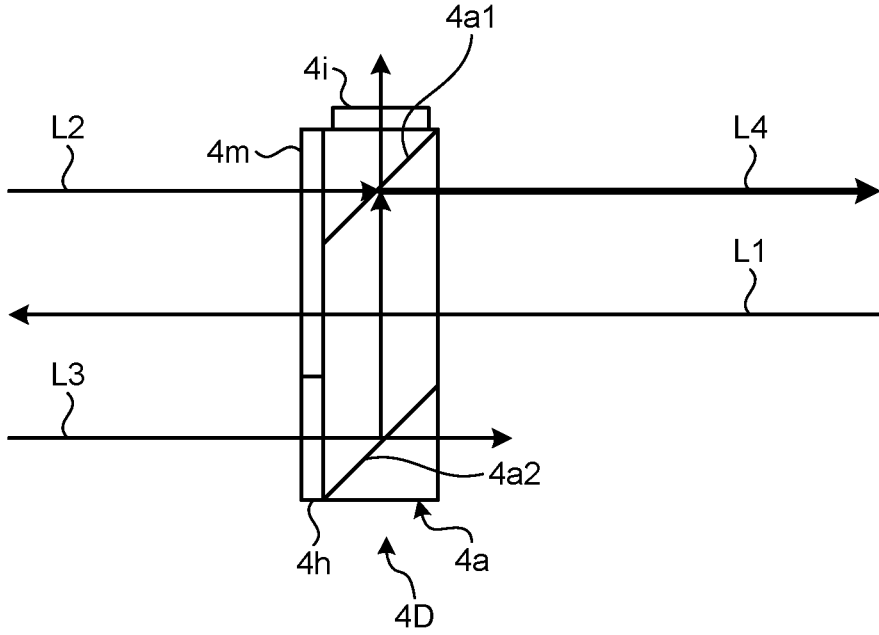
FIG. 5 is a schematic diagram illustrating a polarization controller according to a fourth modification.

FIG. 5 is a schematic diagram illustrating a polarization controller of a fourth modification. A polarization controller 4D is configured such that the first polarizer 4b of the polarization controller 4A is removed and a polarizer 4m is added.

The polarizer 4m is arranged so as to transmit a p-polarized wave and is bonded to the main body 4a by an adhesive agent or optical contact, for example. The polarizer 4m has a function to increase the degree of polarization of the light L1 similarly to the first polarizer 4b, and a function to increase the degree of polarization of the light L2 similarly to the second polarizer 4k of the polarization controller 4B. In other words, the polarizer 4m functions as if the first polarizer and the second polarizer are integrated.

In an optical module using the polarization controller 4D according to the fourth modification, similarly to the polarization controller 4, the polarizer 4m increases the degree of polarization of the light L1, so that it is possible to prevent an increase in the degree of difficulty in assembling the optical module and prevent a decrease in performance of the modulator 5.

Furthermore, in the polarization controller 4D, the polarizer 4m increase the degree of polarization of the light L2. As a result, quality of polarization multiplexing in the main body 4a increases and quality of the light L4 that is subjected to the polarization multiplexing also increases. Moreover, with use of the polarizer 4m that functions as if the first polarizer and the second polarizer are integrated, it is possible to simplify a process of bonding the polarizer to the main body 4a.

Fifth Modification

Figure 6:
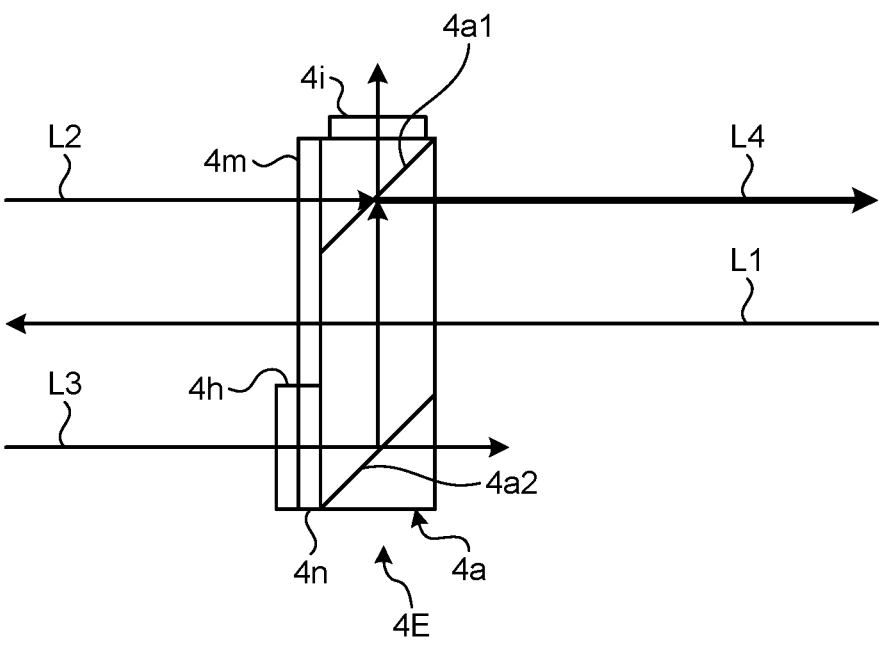
FIG. 6 is a schematic diagram illustrating a polarization controller according to a fifth modification.

FIG. 6 is a schematic diagram illustrating a polarization controller of a fifth modification. A polarization controller 4E is configured such that the first polarizer 4b of the polarization controller 4C of the third modification is replaced with the polarizer 4m of the polarization controller 4D and the third polarizer 4l is replaced with a third polarizer 4n. The third polarizer 4n has the same function as the third polarizer 4l.

In an optical module using the polarization controller 4E according to the fifth modification, similarly to the polarization controller 4, the polarizer 4m increases the degree of polarization of the light L1, so that it is possible to prevent an increase in the degree of difficulty in assembling the optical module and prevent a decrease in performance of the modulator 5.

Furthermore, in the polarization controller 4E, the polarizer 4m further increases the degree of polarization of the light L2 and the third polarizer 4l further increases the degree of polarization of the light L3. As a result, quality of polarization multiplexing in the main body 4a increases and quality of the light L4 that is subjected to the polarization multiplexing also increases. Moreover, with use of the polarizer 4m, it is possible to simplify a process of bonding the polarizer to the main body 4a.

Furthermore, in the polarization controller 4D, it is possible to separately perform a bonding process of each of the polarizers and a bonding process of the half wave plate.

Sixth Modification

Figure 7:
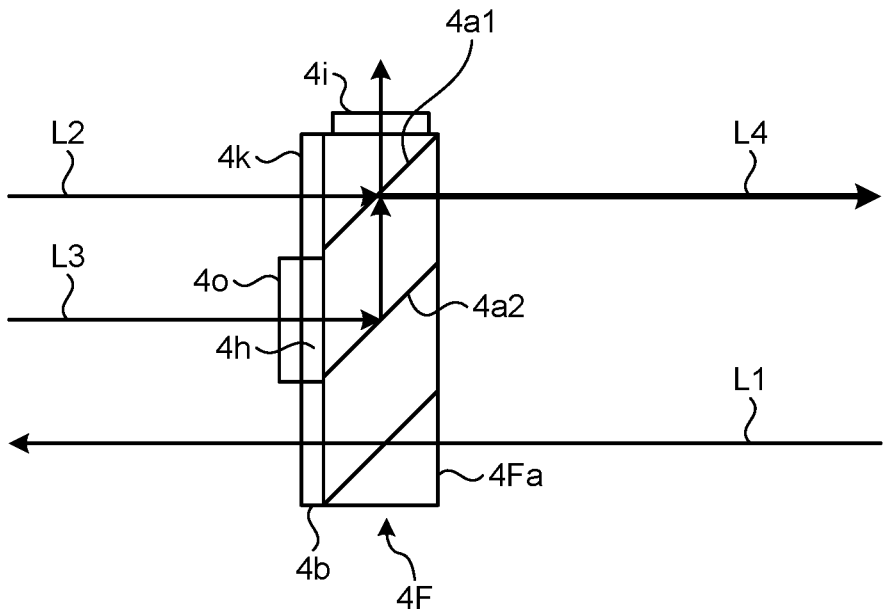
FIG. 7 is a schematic diagram illustrating a polarization controller according to a sixth modification.

FIG. 7 is a schematic diagram illustrating a polarization controller of a sixth modification. An entire polarization controller 4F including a main body 4Fa is configured such that the optical path of the light L1 is located on an opposite side of the optical path of the light L2 with respect to the optical path of the light L3. Furthermore, the polarization controller 4F includes a third polarizer 4o.

In the polarization controller 4F, the first polarizer 4b is arranged at the side of the modulator 5 (not illustrated) such that the light L1 first passes through the main body 4Fa and thereafter passes through the first polarizer 4b.

The third polarizer 4o is arranged so as to transmit a p-polarized wave and is bonded to the half wave plate 4h by an adhesive agent or optical contact, for example. The third polarizer 4o allows the light L3 to pass through the main body 4Fa via the half wave plate 4h.

In an optical module using the polarization controller 4F according to the sixth modification, similarly to the polarization controller 4, the first polarizer 4b increases the degree of polarization of the light L1, so that it is possible to prevent an increase in the degree of difficulty in assembling the optical module and prevent a decrease in performance of the modulator 5.

Furthermore, in the polarization controller 4D, the second polarizer 4k and the third polarizer 4o increase the degrees of polarization of the light L2 and the light L3, so that quality of polarization multiplexing in the main body 4a increases and quality of the light L4 that is subjected to the polarization multiplexing also increases.

Moreover, the entire polarization controller 4F including the main body 4Fa is configured such that the optical path of the light L1 is located on the opposite side of the optical path of the light L2 with respect to the optical path of the light L3, so that, as compared to a case in which the polarization controller 4 is used for example, it is possible to change the positions of the first optical fiber 2 and the second optical fiber 3, and it is possible to change optical layout from the optical module 100.

Seventh Modification

Figure 8:
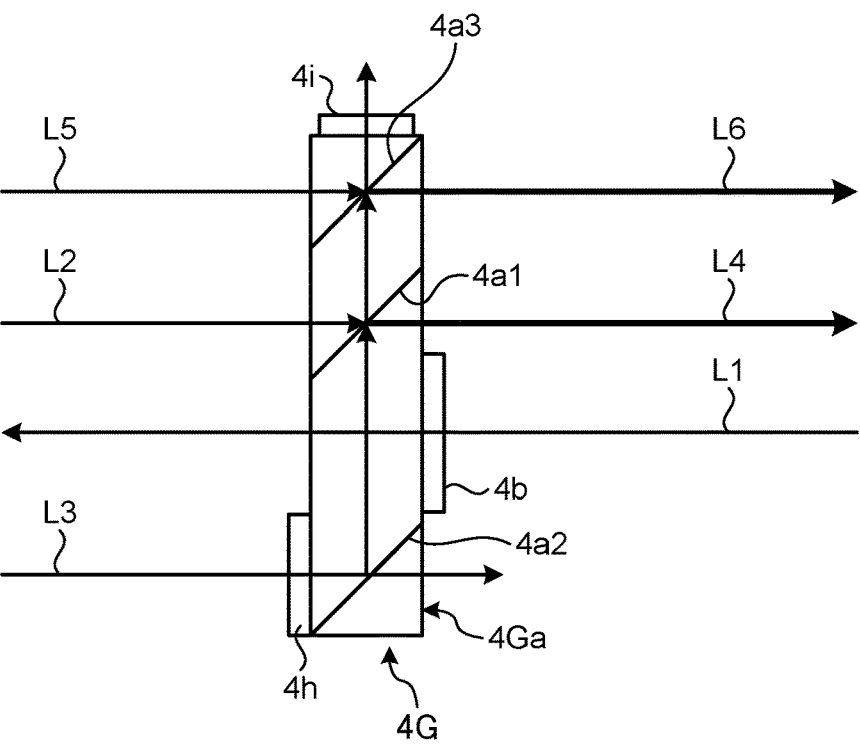
FIG. 8 is a schematic diagram illustrating a polarization controller according to a seventh modification.

FIG. 8 is a schematic diagram illustrating a polarization controller of a seventh modification. In a polarization controller 4G, a main body 4Ga is different from the main body 4a in that a polarization multiplexer and demultiplexer portion 4a3 that is different from the polarization multiplexer and demultiplexer portion 4a1 is included. The polarization multiplexer and demultiplexer portion 4a3 is located on an opposite side of the reflecting portion 4a2 with respect to the polarization multiplexer and demultiplexer portion 4a1. Arrangement of the first polarizer 4b and the half wave plate 4h is the same as in the polarization controller 4.

In the polarization controller 4G, light L5 that is output from an optical device, such as a modulator, is input in addition to the light L2 and the light L3. The light L5 has an approximately linearly-polarized state as approximately p-polarized light.

The polarization multiplexer and demultiplexer portion 4a1 performs polarization multiplexing on the light L2 and the light L3, and outputs polarization-multiplexed light as the light L4. A part of the light L3 is transmitted by the polarization multiplexer and demultiplexer portion 4a1 toward the polarization multiplexer and demultiplexer portion 4a3. The polarization multiplexer and demultiplexer portion 4a3 performs polarization multiplexing on the light L5 and a part of the light L3 that is transmitted by the polarization multiplexer and demultiplexer portion 4a1, and outputs polarization-multiplexed light as light L6. At this time, it is preferable that the polarization multiplexer and demultiplexer portion 4a3 is configured such that an intensity ratio between the part of the light L3 and the light L5 is approximately 1:1.

In an optical module using the polarization controller 4G according to the seventh modification, similarly to the polarization controller 4, the first polarizer 4b increases the degree of polarization of the light L1, so that it is possible to prevent an increase in the degree of difficulty in assembling the optical module and prevent a decrease in performance of an optical device, such as a modulator.

Furthermore, if the polarization controller 4G is used, it is possible to monitor, by a light receiving element or the like, the light L6 that is subjected to polarization multiplexing.

Eighth Modification

Figure 9:
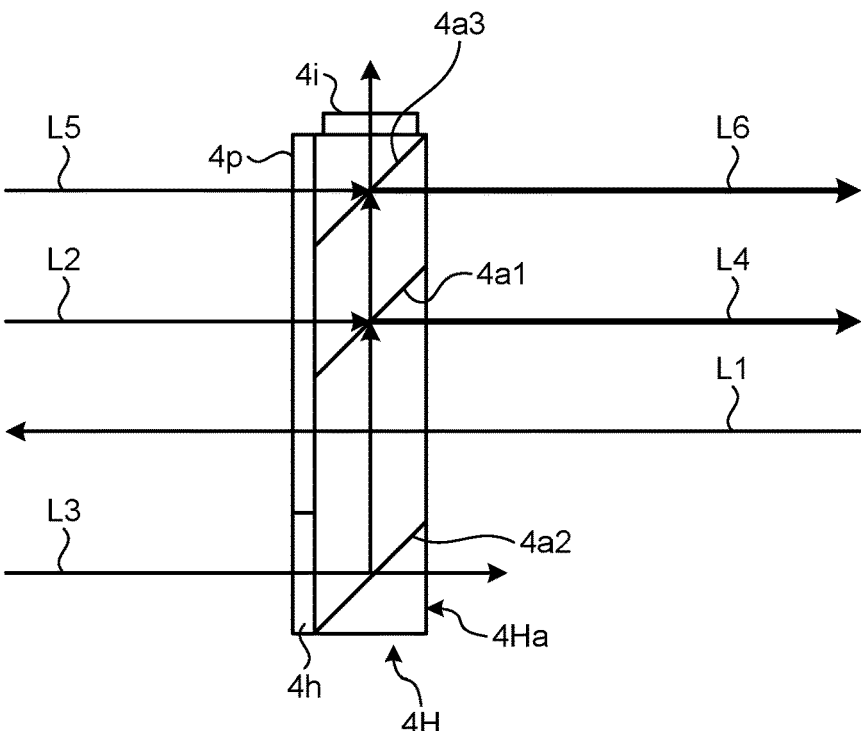
FIG. 9 is a schematic diagram illustrating a polarization controller according to an eighth modification.

FIG. 9 is a schematic diagram illustrating a polarization controller of an eighth modification. In a polarization controller 4H, a main body 4Ha has the same configuration as the main body 4Ga of the polarization controller 4G that includes the polarization multiplexer and demultiplexer portion 4a3 that is different from the polarization multiplexer and demultiplexer portion 4a1. Furthermore, the first polarizer 4b in the polarization controller 4G is replaced with a polarizer 4p.

The polarizer 4p increases the degrees of polarization of the light L1, the light L2, and the light L5. Furthermore, the polarization multiplexer and demultiplexer portion 4a1 performs polarization multiplexing on the light L2 and the light L3, and outputs polarization-multiplexed light as the light L4. Moreover, a part of the light L3 passes through the polarization multiplexer and demultiplexer portion 4a1 and enters the polarization multiplexer and demultiplexer portion 4a3. The polarization multiplexer and demultiplexer portion 4a3 performs polarization multiplexing on the light L5 and the part of the light L3, and outputs light L6. At this time, it is preferable that the polarization multiplexer and demultiplexer portion 4a3 is configured such that an intensity ratio between the part of the light L3 and the light L5 is approximately 1:1.

In an optical module using the polarization controller 4H according to the eighth modification, similarly to the polarization controller 4, the polarizer 4p that functions as the first polarizer increases the degree of polarization of the light L1, so that it is possible to prevent an increase in the degree of difficulty in assembling the optical module and prevent a decrease in performance of an optical device, such as a modulator.

Furthermore, if the polarization controller 4H is used, it is possible to monitor, by a light receiving elements or the like, the light L6 that is subjected to polarization multiplexing.

Ninth Modification

Figure 10:
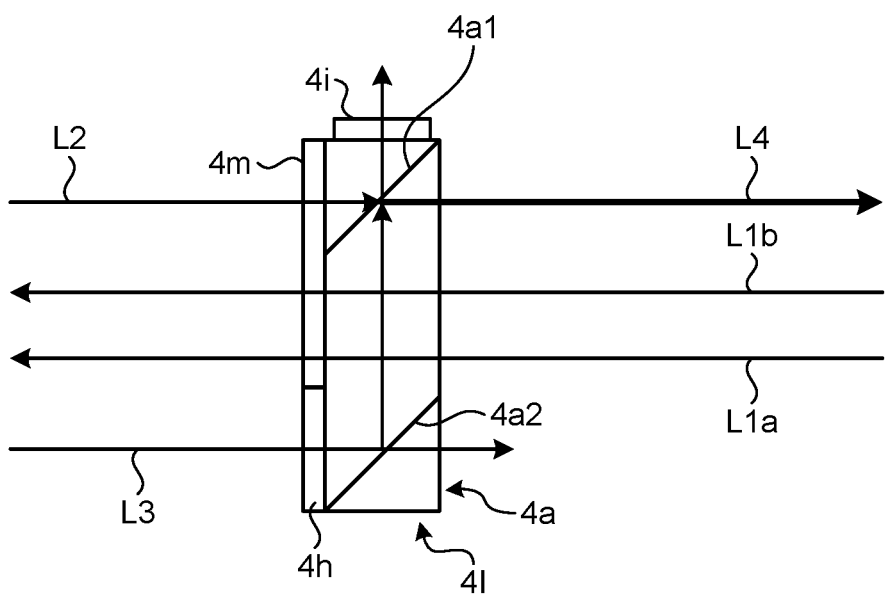
FIG. 10 is a schematic diagram illustrating a polarization controller according to a ninth modification.

FIG. 10 is a schematic diagram illustrating a polarization controller of a ninth modification. A polarization controller 4I is different from the polarization controller 4D of the fourth modification in that two kinds of light, that is, light L1a and light L1b, are used as the fourth light. The light L1a and the light L1b have approximately linearly-polarized states as approximately p-polarized waves. The light L1a and the light L1b are light that are generated by splitting the light L1 into two, for example. The light L1a and the light L1b pass through a space between the polarization multiplexer and demultiplexer portion 4a1 and the reflecting portion 4a2.

The polarization controller 4I achieves the same effects as the polarization controller 4D. Furthermore, it is possible to increase the degrees of polarization of the light L1a and the light L1b by the single polarizer 4m.

Tenth Modification

Figure 11:
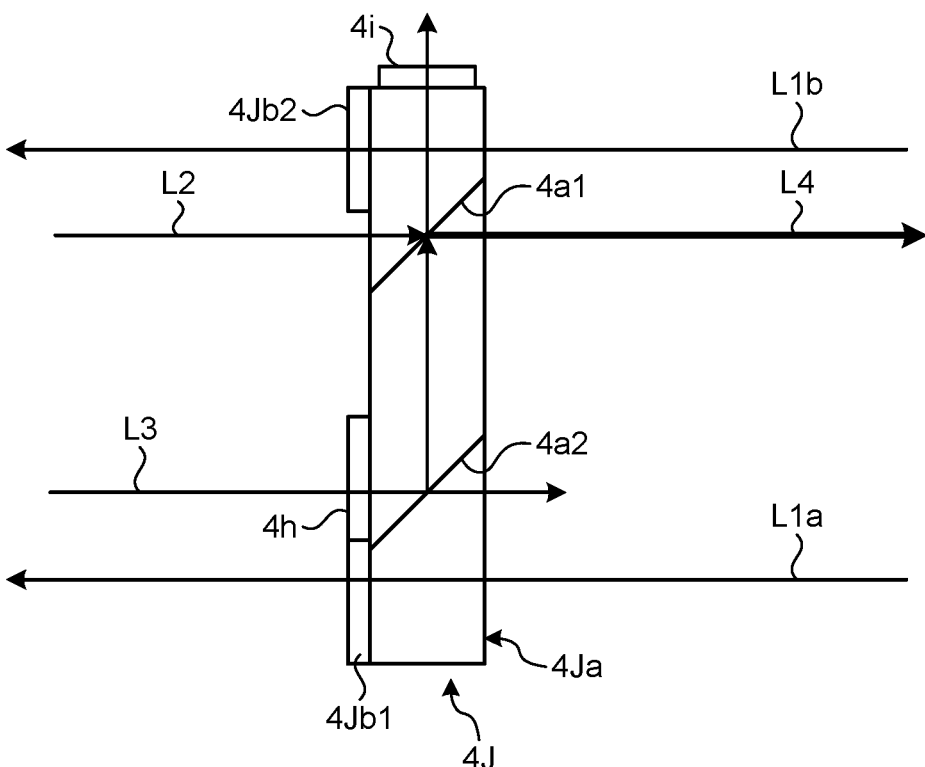
FIG. 11 is a schematic diagram illustrating a polarization controller according to a tenth modification.

FIG. 11 is a schematic diagram illustrating a polarization controller of a tenth modification. An entire polarization controller 4J including a main body 4Ja is configured such that optical paths of the light L1a and the light L1b are located at the sides of ends relative to the polarization multiplexer and demultiplexer portion 4a1 and the reflecting portion 4a2, respectively. Furthermore, the polarization controller 4F includes first polarizers 4Jb1 and 4Jb2. The first polarizers 4Jb1 and 4Jb2 are arranged so as to transmit p-polarized waves.

In an optical module using the polarization controller 4J according to the tenth modification, similarly to the polarization controller 4, the first polarizers 4Jb1 and 4Jb2 increase the degrees of polarization of the light L1a and the light L1b, so that it is possible to prevent an increase in the degree of difficulty in assembling the optical module and prevent a decrease in performance of an optical device, such as a modulator.

Eleventh Modification

Figure 12:
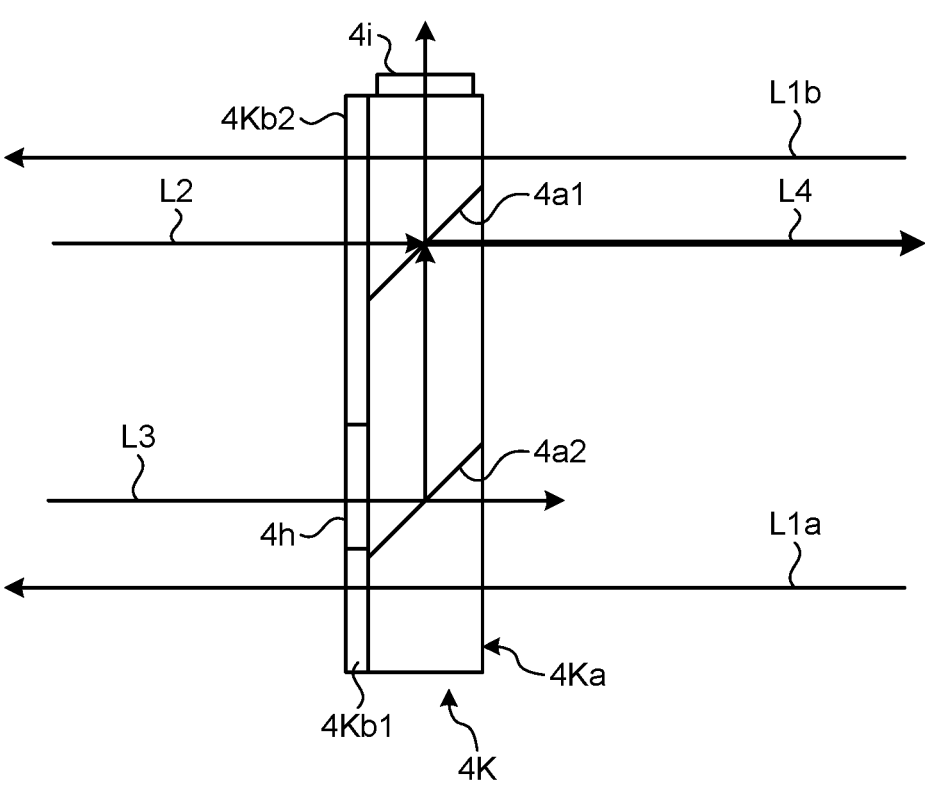
FIG. 12 is a schematic diagram illustrating a polarization controller according to an eleventh modification.

FIG. 12 is a schematic diagram illustrating a polarization controller of an eleventh modification. An entire polarization controller 4K including a main body 4Ka is configured such that, similarly to the polarization controller 4J of the tenth modification, the optical paths of the light L1a and the light L1b are located at the sides of the ends relative to the polarization multiplexer and demultiplexer portion 4a1 and the reflecting portion 4a2, respectively. Furthermore, a polarization controller 4K includes first polarizers 4Kb1 and 4Kb2. The first polarizers 4Kb1 and 4Kb2 are arranged so as to transmit p-polarized waves.

In an optical module using the polarization controller 4K according to the eleventh modification, similarly to the polarization controller 4, the first polarizers 4Kb1 and 4Kb2 increase the degrees of polarization of the light L1a and the light L1b, so that it is possible to prevent an increase in the degree of difficulty in assembling the optical module and prevent a decrease in performance of an optical device, such as a modulator. Furthermore, it is possible to increase the degree of polarization of the light L2 by the first polarizer 4Kb1.

Meanwhile, in the embodiment as described above, it is preferable that the main body of each of the polarization controllers is configured such that a center-to-center distance between two kinds of light whose optical paths are located adjacent to each other among the plurality of kinds of light L1, L2, L3, L4, L5, and L6 is equal to or larger than a mode field diameter of light. With this configuration, it is possible to prevent interference with adjacent light. Moreover, it is preferable that each of the main bodies is configured such that a center-to-center distance between two kinds of light whose optical paths are located adjacent to each other among the plurality of kinds of light L1, L2, L3, L4, L5, and L6 is equal to or smaller than 2 millimeters (mm). With this configuration, it is possible to reduce a size of the polarization controller.

Furthermore, in the embodiment as described above, the optical device is not limited to a modulator, but may be an optical device whose performance is dependent on a polarized state of light, such as a coherent mixer, a light source such as a laser device, or a light receiving element such as a photodiode.

Moreover, in the embodiment as described above, the polarization controller functions as an optical multiplexer, but may also function as a polarization splitter due to reciprocity of light.

The optical module according to the disclosure is able to prevent an increase in a degree of difficulty in assembling and prevent a decrease in performance in accordance with a polarized state of light.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical module comprising:
a polarization controller that includes
    a main body including a polarization multiplexer and demultiplexer portion that, upon input of two kinds of light that are in perpendicularly-polarized states, performs polarization multiplexing on the two kinds of light and output polarization-multiplexed light, and upon input of light, performs polarization demultiplexing on the light and outputs two kinds of light that are in perpendicularly-polarized states,
    a first polarizer,
    a first input portion,
    a second input portion,
    a third input portion,
    a first output portion, and
    a second output portion;
an optical device configured to receive input of light via the polarization controller and output light via the polarization controller; and
a first optical fiber, wherein
the optical device is configured to output first light and second light to the polarization controller,
the polarization controller is configured to perform, by the polarization multiplexer and demultiplexer portion, polarization multiplexing on the first light that is input from the first input portion and the second light that is input from the second input portion, and output polarization-multiplexed light as third light from the first output portion, and
the polarization controller is configured to allow fourth light that is output from the first optical fiber and input from the third input portion to pass through the first polarizer and output the fourth light from the second output portion to the optical device, the polarization controller includes a half wave plate configured to rotate a polarization direction of the second light, and
the half wave plate is located on an opposite side of the first polarizer with respect to the main body such that no physical interference occurs between the half wave plate and the first polarizer.

2. The optical module according to claim 1, wherein the polarization controller includes a second polarizer configured to transmit the first light.

3. The optical module according to claim 2, wherein the first polarizer and the second polarizer are integrated with each other.

4. The optical module according to claim 1, wherein the polarization controller includes a third polarizer configured to transmit the second light.

5. The optical module according to claim 1, wherein the first optical fiber is a polarization-maintaining optical fiber.

6. The optical module according to claim 1, further comprising:
a second optical fiber, wherein
    the polarization controller is configured to output the third light to the second optical fiber.

7. The optical module according to claim 6, wherein the second optical fiber is a polarization independent optical fiber.

8. The optical module according to claim 1, wherein a polarizer included in the polarization controller is made of at least one of glass, calcite, $YVO_4$, $Li_2B_4O_7$, and $TiO_2$.

9. The optical module according to claim 1, wherein a polarizer included in the polarization controller is connected to the main body by bonding.

10. The optical module according to claim 9, wherein the bonding is performed by an adhesive agent.

11. The optical module according to claim 10, wherein the adhesive agent is transparent with respect to light that is input to the polarization controller.

12. The optical module according to claim 9, wherein the bonding is performed by optical contact.

13. The optical module according to claim 1, wherein the optical device is one of a modulator, a coherent mixer, a light source, and a light receiving element.

14. The optical module of claim 1, wherein:
the half-wave plate is disposed at the second input portion on a first surface of the main body,
the first polarizer is disposed at the third input portion on an opposite surface of the main body,
the main body is interposed between the half-wave plate and the first polarizer with a separation therebetween,
the first polarizer is aligned to transmit the fourth light toward the second output portion, and
the half-wave plate is located in the optical path of the second light at the second input portion.

* * * * *